United States Patent [19]
Petzel

[11] Patent Number: 5,613,464
[45] Date of Patent: Mar. 25, 1997

[54] PLATFORM ACTUATED FEEDER APPARATUS

[76] Inventor: Jeffrey L. Petzel, R.R. #1, Box 119, Longton, Kans. 67352

[21] Appl. No.: 343,039

[22] Filed: Nov. 21, 1994

[51] Int. Cl.$^6$ ................................................. A01K 5/00
[52] U.S. Cl. ................................................. 119/55; 119/62
[58] Field of Search ........................... 119/55, 52.4, 54, 119/51.12, 62

[56] References Cited

U.S. PATENT DOCUMENTS

| | | | |
|---|---|---|---|
| 101,766 | 4/1870 | Richardson | 119/55 |
| 420,168 | 1/1890 | Rodgers | 119/55 |
| 434,856 | 8/1890 | Wright | 119/54 |
| 1,116,958 | 11/1914 | Tuttle | 119/55 |
| 1,380,564 | 6/1921 | Kennedy | 119/54 |
| 1,449,485 | 3/1923 | Alspach | 119/54 |
| 1,483,683 | 2/1924 | Rush | 119/55 |
| 2,595,324 | 5/1952 | Baker | 119/55 |
| 3,301,219 | 1/1967 | Hellekson | 119/55 |
| 3,763,826 | 10/1973 | Portelli | 119/52.1 |
| 4,582,023 | 4/1986 | Zumbahlen et al. | 119/53.5 |

Primary Examiner—Robert P. Swiatek
Assistant Examiner—Yvonne R. Abbott
Attorney, Agent, or Firm—Phillip A. Rein

[57] ABSTRACT

A platform actuated feeder apparatus including a storage and delivery assembly interconnected to a platform and access lid assembly by an actuator linkage assembly. The storage and delivery assembly includes 1) a hopper material storage assembly which is open at the top providing easy access for replenishment of material contained therein; 2) a hopper lid assembly to enclose the hopper material storage assembly; and 3) the storage and delivery assembly is elevated to a practical height by a hopper support assembly. A stored material, such as pet food, is dispensed to a discharge section of the hopper material storage assembly and is covered at that point by an access lid assembly. A user, such as a pet, would stand on a hinged actuator platform assembly engaging an articulated actuator linkage assembly thereby raising an access lid member which will reamin open for as long as the pet remains on a portion of the actuator platform assembly.

4 Claims, 2 Drawing Sheets

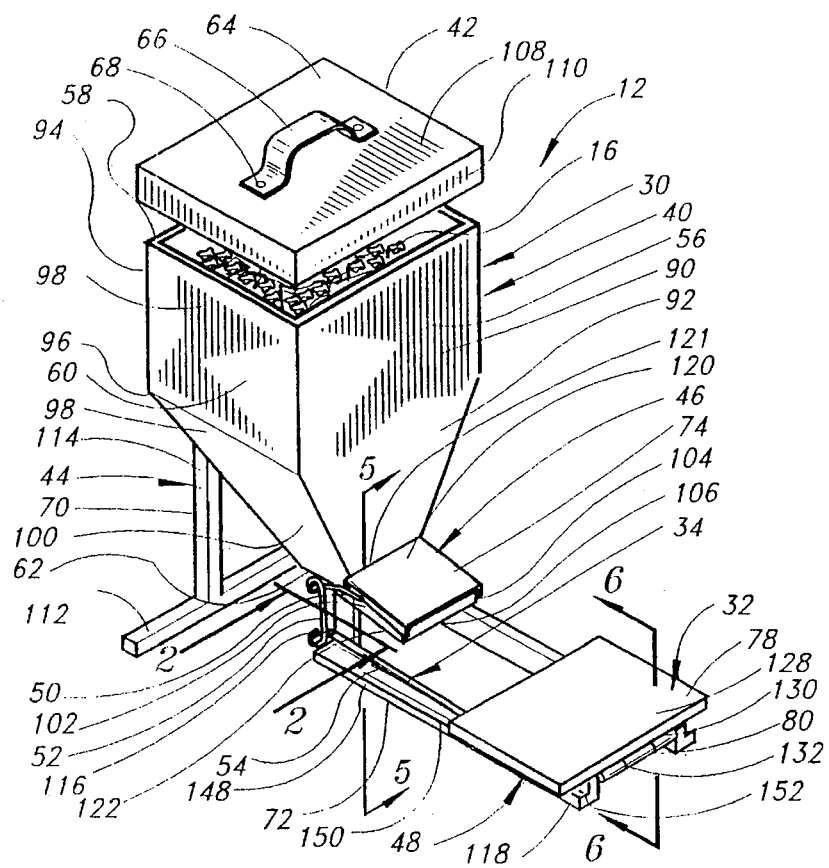
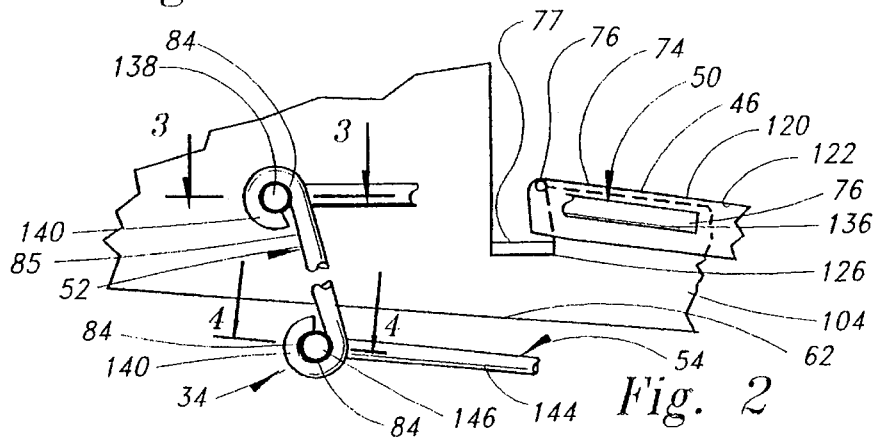
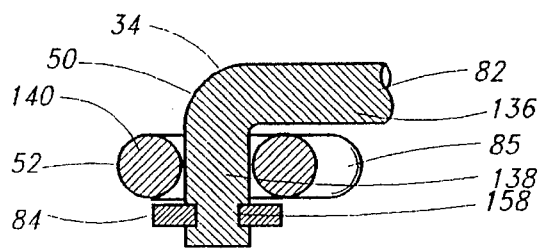 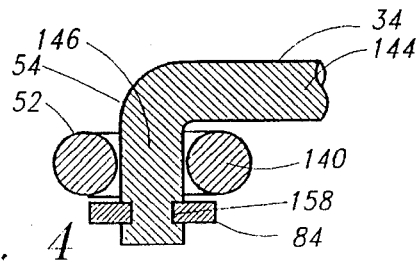

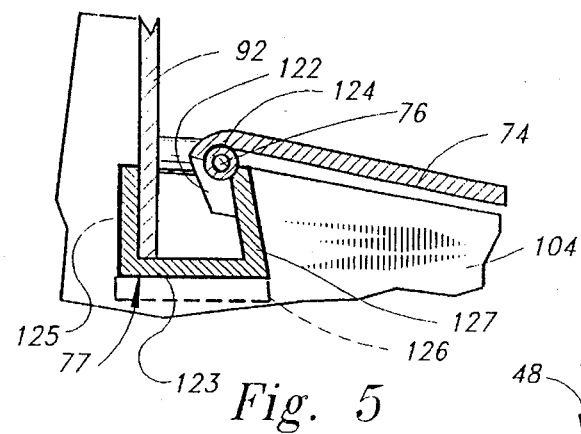
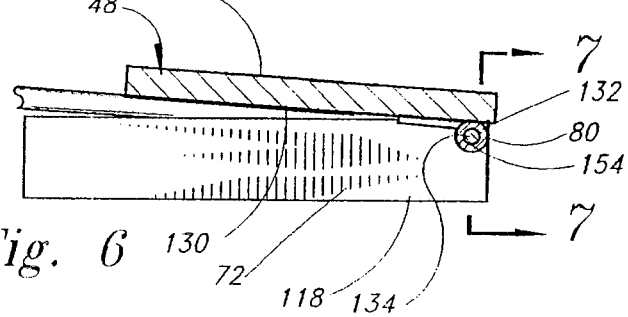
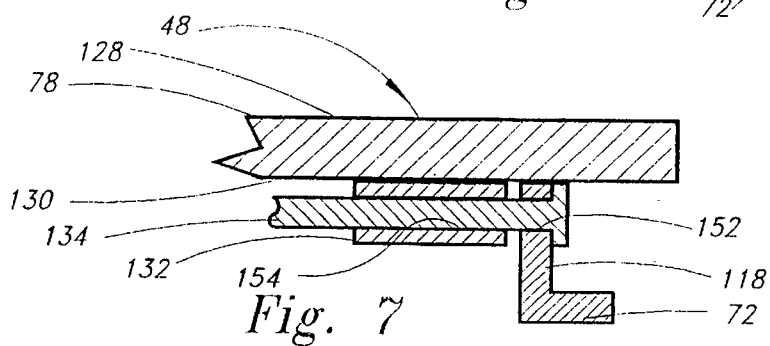
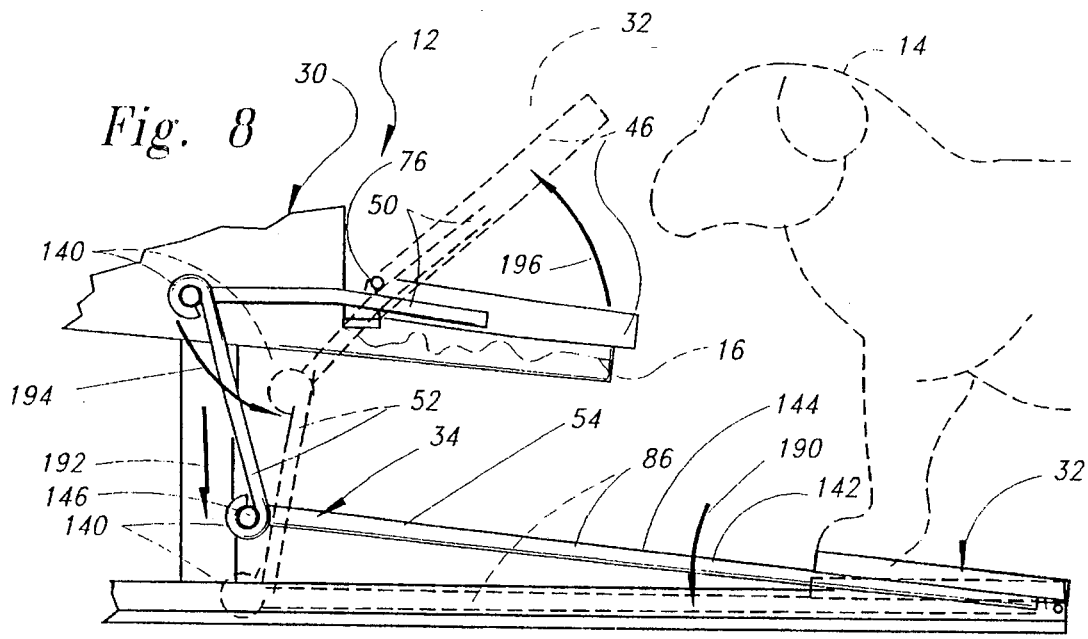

PLATFORM ACTUATED FEEDER APPARATUS

PRIOR ART

A prior art search was conducted on this invention and revealed the following United States patent:

| U.S. Pat. No. | Invention | Inventor |
| --- | --- | --- |
| 4,263,876 | INSECT ISOLATED ANIMAL FEEDER | John H. Scott |

The Scott patent discloses an insect isolated animal feeder operable through a platform to raise and lower a cover over a feed pan.

PREFERRED EMBODIMENT OF THE INVENTION one preferred embodiment of this invention, a platform actuated feeder apparatus is provided having 1) a storage and delivery assembly interconnected to 2) a platform and access lid assembly by 3) an actuator linkage assembly. The storage and delivery assembly is constructed of rigid material such as sheet metal formed into a hopper material storage assembly that is enclosed at a top area with a removable hopper lid assembly and the storage and delivery assembly is elevated above a ground surface to suitable height by a hopper support assembly.

The hopper material storage assembly provides storage for a material such as pet food by means of an interdependent front wall member; back wall member; two side wall members; and a bottom wall member. The four wall members are assembled so as to concentrate any hopper contents towards the bottom wall member. The pet food is then directed to an open discharge section and prevented from further lateral or forward movement by means of side support sections integral with a forward retainer section.

The hopper lid assembly covers and protects the pet food in the hopper material storage assembly and is comprised of a lid cover member having a handle member connected thereto by connector members.

The hopper support assembly is divided into a first support assembly which supports the hopper material storage assembly and a second support assembly which supports a forward portion of the hopper material storage assembly and the platform and access lid assembly.

The platform and access lid assembly includes 1) an access lid assembly that covers the discharge section of the hopper material storage assembly; 2) an actuator platform assembly operable to actuate the access lid assembly; and 3) an actuator linkage assembly connected between the access lid assembly and the actuator platform assembly. The access lid assembly covers the pet food present in the discharge section by means of a lid member interconnected to the hopper side wall members by a lid support member.

The actuator platform assembly includes an actuator plate member pivotally mounted at a forward section of the second by a support hinge assembly. The actuator plate member provides a top actuator surface and an underside connector surface to which is fastened the support hinge member.

The actuator linkage assembly provides a mechanical link raising the access lid assembly when the actuator plate member is depressed. The actuator linkage assembly includes 1) a lid connector assembly; 2) a platform connector assembly and 3) an intermediate link member.

The lid connector assembly is connected to the access lid assembly to pivot the lid member from a closed position to an open access position about the discharge section of the hopper material storage assembly.

The platform connector assembly comprises a platform connector member having one end attached to the connector surface the actuator plate member and an outer end pivotally connected to the intermediate link member.

The intermediate link member has an intermediate body section having connector clasps at each outer end. The connector clasps are respectively pivotally connected to outer ends of the platform connector member and the lid connector assembly. The resulting articulated linkage allows the access lid assembly to fully reveal the contents of the discharge section on depression the actuator plate member of the actuator platform assembly.

OBJECTS OF THE INVENTION

One object of this invention is to provide a platform actuated feeder apparatus including a storage and delivery assembly connected to a platform and access lid assembly by an actuator linkage assembly furnishing covered storage of material yet provides easy access for material replenishment.

Another object of this invention is to provide a platform actuator and feeder apparatus which alleviates frequent refilling requirements by supplying a hopper material storage assembly for controlled material discharge therefrom.

Still, another object of this invention is to provide a platform actuated feeder apparatus that is configured such that, when an actuator plate member is depressed with the weight of the user, an access lid assembly opens revealing a quantity of material such as pet food in a discharge section of a hopper material storage assembly.

Another object of this invention is to provide a platform actuated feeder apparatus having a storage and delivery assembly that is elevated to a comfortable height for the intended user by employing a hopper support assembly.

An additional object of this invention is to provide a platform actuated feeder apparatus configured such that when an actuator platform assembly is depressed by front leg members of a pet, the pet's head is positioned above a feed discharge area.

A further object of this invention is to provide a platform actuated feeder apparatus that does not require any electricity or external power to actuate restricts use by unintended users such as rodents, wild animals, insects, etc.; and is simple in operation so that a pet can be easily trained in its use.

still, one other object of this invention is to provide a platform actuated feeder apparatus that is sturdy in construction; easy to assemble; can be constructed of noncorrosive materials such as aluminum or plastic; simple to use and load with a material to be dispensed; and substantially maintenance free.

Various other objects, advantages and features of the invention will become apparent to those skilled in the art from the following discussion, taken in conjunction with the accompanying drawings, in which:

FIGURES OF THE INVENTION

FIG. 1 is a perspective view of a platform actuated feeder apparatus of this invention;

FIG. 2 is an enlarged fragmentary elevational view taken along line 2—2 in FIG.

FIG. 3 is an enlarged fragmentary sectional view taken along line 3—3 in FIG. 2;

FIG. 4 is an enlarged fragmentary sectional view taken along line 4—4 in FIG.

FIG. 5 is an enlarged fragmentary sectional view taken along line 5—5 in FIG. 2;

FIG. 6 is an enlarged fragmentary sectional view taken along line 6—6 in FIG. 1;

FIG. 7 is an enlarged fragmentary sectional view taken along line 7—7 in FIG. 6; and FIG. 8 is a schematic diagram representing the operating features by use of a pet of the platform actuated feeder apparatus of this invention.

The following is a discussion and description of preferred specific embodiments of the platform actuated feeder apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a platform actuated feeder apparatus of this invention, indicated generally at 12, includes 1) a storage and delivery assembly 30; 2) a platform and access lid assembly 32; and 3) an actuator linkage assembly 34 interconnecting the storage and delivery assembly 30 to the platform and access lid assembly 32.

The storage and delivery assembly 30 includes 1) a hopper material storage assembly 40 constructed of a material sturdy enough to support a quantity of material such as pet food 16; 2) a hopper lid assembly 42 releasably mounted on an upper end of the hopper material storage assembly 40; and 3) a hopper support assembly 44 to support the hopper material storage assembly 40 on a ground surface.

The hopper material storage assembly 40 is open at the top for ease of filling the hopper and is comprised of 1) a front wall member 56; 2) a back wall member 58; 3) two mirror image side wall members 60; and 4) a bottom wall member 62, all integrally connected to adjacent ones of the subject wall members 56, 58, 60, and 62. The front wall member 56 has a rectangular upper wall section 90 which is integrally connected to a coplanar lower tapered wall section 92.

The back wall section 58 has a rectangular upper back wall section 94 similar to the front wall member 56, integrally connected to an inwardly and downwardly tapered lower inclined back wall section 96.

The side wall members 60 each include rectangular upper side wall sections 98 that change to an inwardly and downwardly tapered lower inclined side wall section 100.

The sloped bottom wall member 62 includes a support section 102 integral with a discharge section 104 which, in turn, is integral with a retainer portion or wall 106 forming a feeding trough to receive and hold the pet food 16 therein. The result of the collective tapered, inclined support section 102 is a funneling of the hopper contents to the discharge or trough section 104. The support section 102 is sloped terminating at the retaining portion 106 assuring a constant supply of pet food 16 is available.

The hopper lid assembly 42 provides a means to protect the pet food 16 as it is present in the hopper material storage assembly 40. The hopper lid assembly 42 includes a lid cover member 64 having a handle member 66 secured thereto by connector members 68. The lid cover member 64 includes a rectangular top wall section 108 integrally connected on all four sides to side wall sections 110. The hopper lid assembly 42 is constructed such dimensions as to allow it to fit securely atop the hopper material storage assembly 30 in a sealing manner.

The hopper support assembly 44 provides stability to the invention through a first support assembly 70 and a second support assembly 72. The first support assembly 70 is constructed horizontal support member 112 to which are affixed a pair spaced vertical support members 114. The vertical support members 114 are of sufficient length to attach to the upper back wall section 94 of the hopper material storage assembly 40 where they are suitably fastened, as by welding, to provide a rigid support structure for the hopper material storage assembly 40.

The second support assembly 72 is composed of two horizontally oriented spaced parallel platform support members 118 with inner respective ends, being first connector sections 148, secured to a vertical hopper support member 116. An outer second connector section 150 of each platform support member 118 extends towards an actuator platform assembly 48. Each platform support member 118 has a shaft support opening 152 to provide alignment and support for the actuator platform assembly 48 as will be described.

The platform and access lid assembly 32 includes an access lid assembly 46 and an actuator platform assembly 48. The access lid assembly 46 selectively covers the discharge section 104 of the hopper material storage assembly 40 and comprises a lid member 74 connected to a lid support dowel or shaft member 76 and a water channel member 77.

The lid member 74 is constructed of a top wall section 120 integral with downwardly depending side wall sections 122 oriented so that a rear edge portion 121 is aligned closest to the lower tapered wall section 92 of the front wall member 56 for sealing purposes. The side wall sections 120 enclose the discharge section 104 of the hopper material storage assembly 40 in an enclosed position as shown in FIGS. 1 and 2.

The lid support shaft member 76 pivotally connects the lid member 74 to rearward, upper edges of the discharge section 104. The lid support shaft member 76 extends through a tubular support member 124 which is welded to the discharge section 104 and the adjacent water channel member 77 (FIG. 5). Outer ends of the lid support shaft member 76 are secured to respective ones of the side wall sections 122 so as to be rotatable with the lid member 74 as shown in FIG. 5.

The water channel member 77 is of a generally U-shape in transverse cross section having a support section 123 integral with a support leg 125 and an inclined support leg 127. The support leg 125 is secured to an inner surface of the tapered wall section 92. The inclined support leg 127 is secured to the tubular support member 124 and upper portions of the discharge section 104.

Outer ends of the water channel member 77 are found with downwardly extended flange sections 126 extended outwardly of side walls of the discharge section 104 to prevent water from contaminating any pet food 16 contained therein.

The actuator platform assembly 48 is fabricated of an actuator plate member 78 connected to a support hinge assembly 80. The actuator plate member 78 is a generally plane, rectangular piece having a top actuator surface 128 that would engage the weight of a pet or user 14 with a bottom face being a connector surface 130.

As indicated in FIGS. 6 and 7, the support hinge assembly 80 includes a hinge member 132 and a support pin or shaft member 134. The support pin member 134 is connected to the hinge member 132 by means of threading the support pin member 134 through a connector opening 154. Outer extended ends of the support pin member 134 are anchored to respective ones of the platform support members 118 being mounted in the shaft support openings 152.

As indicated in FIG. 2, the actuator linkage assembly 34 includes a lid connector assembly 50 connected by an intermediate link member 52 to a platform connector assembly 54. The lid connector assembly 50 is comprised of a lid anchor member 82 and a retainer clip member 84.

The lid anchor member 82 is used by securing an anchor section 136 to the side wall section 122 of the lid member 74 as by welding or the like. At an opposite end of lid anchor member 82, a pivotal connector section 138 is formed by bending the rod stock 90° (FIG. 3) inwardly. The pivotal connector section 138 has a connector groove 158 operable to receive the retaining clip member 84 preventing accidental disassembly of the lid connector assembly 50.

As shown in FIG. 2, the intermediate link member 52 includes a main body section 85 provided at each end with an eye-shaped clasp section 140.

The platform connector assembly 54 includes a platform connector member 86 and a retaining clip member 84. The platform connector member 86 is connected to the connector surface 130 of the actuator plate member 78 through an anchor end section 142. The platform connector member 86 extends from a main body section 144 to an L-shaped link connector section 146. The link connector section 146 ends in a connector groove 158 to receive the retaining clip member 84 therein as indicated in FIG. 4.

USE AND OPERATION OF THE INVENTION

In the use and operation of this invention, the platform actuated feeder apparatus 12 is initially placed in service by locating it in an area that a pet 14 or other user would find convenient, preferably an area previously reserved for feeding purposes. As shown in its static, prepared state such as FIG. 1, the platform actuated feeder apparatus 12 has pet food 16 available but access is protected by the hopper lid assembly 42 and the access lid assembly 46 in the enclosed positions.

To use the platform actuated feeder apparatus 12 as a pet actuated feed dispenser, the storage and delivery assembly 30 is filled with a quantity of pet food 16 by removing the hopper lid assembly 42. Gravity, aided by the design of the hopper material storage assembly 40, facilitates the distribution of the pet food 16 to the discharge section 104. The hopper lid assembly 42 is then replaced.

As shown in FIG. 8, a pet 14 would approach the platform actuated feeder apparatus 12 and place its front paws on the actuator plate member 78. The weight of the pet 14 would pivot the actuator plate member 78 causing it to pivot around the support hinge assembly 80 and the support pin member 134, as shown by an arrow 190, and operating the actuator linkage assembly 34.

As the platform connector assembly 54 pivots downwardly as noted by the arrow 190 the intermediate link member 52 shifts downwardly with the joints providing rotational freedom as noted by an arrow 192. This causes the lid connector assembly 50 to rotate around the lid connector opening 125 as shown by an arrow 1194.

The access lid assembly 46 will then rise as shown by an arrow 196 allowing access to the pet food 16 in the discharge section 104. The lid member 74 will remain in the raised access position for as long as the pet 14 remains standing on the actuator plate member 78.

The platform actuated feeder apparatus 12 is biased so that when the pet 14 leaves, the weight of the lid member 74 closes the access lid assembly 46 reversing the interaction of the actuator linkage assembly 34 as previously described and returning the actuator platform assembly 48 to the raised position of FIG. 6.

The water channel member 77 provides a rough between the front wall member 56 of the storage and delivery assembly 30 and the lid member 74 and directs any rain fall laterally thereof. This keeps water out of the discharge section 104 so that any pet food 16 therein will not be contaminated.

While the invention has been described in conjunction with preferred specific embodiments thereof, it will be understood that this description is intended to illustrate and not to limit the scope of the invention, which is defined by the following claims:

I claim:

1. A platform actuated feeder apparatus operable to selectively dispense material therefrom, comprising:

a) a storage and delivery assembly having a platform and access lid assembly connected thereto;

b) said storage and delivery assembly adapted to receive the material therein and having a discharge section;

c) said platform and access lid assembly includes a lid member mounted adjacent said discharge section operable to selectively reveal and enclose the material in said discharge section; and an actuator platform assembly;

d) an actuator linkage assembly connecting said lid member to said actuator platform assembly;

e) said actuator linkage assembly having a lid connector assembly connected at one end to said lid member and pivotally connected at an opposite end to an intermediate link member which, in turn, is pivotally connected to a platform connector assembly which is connected to said actuator platform assembly; and f) said actuator platform assembly includes an actuator plate member having an outermost end pivotally connected to said platform connector assembly;

whereby movement of said actuator platform assembly in a downward pivotal movement about said platform connector assembly operates to immediately pivot said lid member to reveal the material in said discharge section.

2. A platform actuated feeder apparatus as described in claim 1, wherein:

a) said storage and delivery assembly includes a support assembly connected to a hopper material storage assembly and to said actuator linkage assembly.

b) said actuator platform assembly includes an actuator plate member pivotally connected at said outermost end to said support assembly and to said actuator linkage assembly;

c) said actuator plate member pivotal downwardly about said support assembly to move said actuator linkage assembly and said lid member to an open condition to reveal the material in said discharge section; and d) on release of pressure against the actuator platform member, the weight of said lid member operates to move said actuator linkage assembly and said actuator plate member to pivot in an upward direction to move said lid member to enclose said discharge section under force of gravity to prevent access to the material contained therein.

3. A platform actuated feeder apparatus comprising:

a) a hopper material storage assembly operable to receive, store and dispense material therefrom to a discharge section;

b) an access lid assembly connected to said hopper material storage assembly selectively movable from a first position enclosing the material in said discharge section and to a second position revealing the material in said discharge section;

c) an actuator plate member;

d) means connecting an outermost end of said actuator plate member to said access lid assembly;

e) said access lid assembly having a lid member pivotally connected to a portion of said discharge section; and f) said access lid assembly having a water channel member mounted between said hopper material storage assembly and said lid member to direct fluids laterally of and prevent their entry into said discharge section whereby pivotal movement of said actuator plate member about said outermost end operates to move said access lid assembly to an opened position.

4. A platform actuated feeder apparatus as described in claim 3, wherein:

a) said water channel member of U-shape and having outer downwardly depending flangye sections positioned laterally of said discharge section to direct the fluids laterally thereof.

* * * * *